(12) United States Patent
Odaka et al.

(10) Patent No.: US 7,615,105 B2
(45) Date of Patent: Nov. 10, 2009

(54) SEPARATION MEMBRANE

(75) Inventors: Yoshifumi Odaka, Shiga (JP); Osamu Nakamatsu, Shiga (JP); Ichiro Kumo, Shiga (JP)

(73) Assignee: Toray Industries, Inc., Tokyo (JP)

( * ) Notice: Subject to any disclaimer, the term of this patent is extended or adjusted under 35 U.S.C. 154(b) by 216 days.

(21) Appl. No.: 10/497,971

(22) PCT Filed: Dec. 9, 2002

(86) PCT No.: PCT/JP02/12850

§ 371 (c)(1),
(2), (4) Date: Jun. 9, 2004

(87) PCT Pub. No.: WO03/049843

PCT Pub. Date: Jun. 19, 2003

(65) Prior Publication Data

US 2005/0087070 A1    Apr. 28, 2005

(30) Foreign Application Priority Data

Dec. 10, 2001    (JP) ............................. 2001-375424

(51) Int. Cl.
*B01D 53/22* (2006.01)

(52) U.S. Cl. ................ 96/11; 210/321.83; 210/321.85; 96/10

(58) Field of Classification Search .................. 96/11, 96/10, 4; 210/490, 321.83, 321.85, 503, 210/506, 507
See application file for complete search history.

(56) References Cited

U.S. PATENT DOCUMENTS

| | | | | |
|---|---|---|---|---|
| 3,022,187 A | * | 2/1962 | Eyrand et al. ............... | 428/545 |
| 3,332,216 A | * | 7/1967 | Stern .............................. | 96/12 |
| 3,657,113 A | * | 4/1972 | Stancell et al. .............. | 210/654 |
| 3,756,408 A | * | 9/1973 | Spatz et al. ................. | 210/96.1 |
| 3,874,986 A | * | 4/1975 | Browall et al. ........... | 428/315.9 |
| 3,933,561 A | * | 1/1976 | Larson et al. ............... | 156/246 |
| 3,980,456 A | * | 9/1976 | Browall ......................... | 96/13 |
| 4,230,463 A | * | 10/1980 | Henis et al. .................... | 95/47 |
| 4,415,608 A | * | 11/1983 | Epperson et al. ............ | 427/244 |
| 4,871,378 A | * | 10/1989 | Pinnau ........................... | 95/47 |
| 4,933,083 A | * | 6/1990 | Jones, Jr. ..................... | 210/490 |
| 5,034,126 A | * | 7/1991 | Reddy et al. ........... | 210/321.74 |
| 6,045,899 A | * | 4/2000 | Wang et al. .............. | 428/315.7 |
| 2003/0136727 A1 | * | 7/2003 | Yamada et al. .............. | 210/490 |

FOREIGN PATENT DOCUMENTS

DE    36 28 187 C1    2/1988

(Continued)

*Primary Examiner*—Duane Smith
*Assistant Examiner*—Ives Wu
(74) *Attorney, Agent, or Firm*—Birch, Stewart, Kolasch & Birch, LLP

(57) ABSTRACT

It is an object of the present invention to provide a separation membrane in which a film-forming solution can be prevented from reaching a rear surface of a porous support in a step of forming a film, the adhesion between a functional film for separation and the porous support is high, and the thickness can be reduced. In the present invention, the separation membrane includes a porous support having a rough rear surface and a functional film for separation, and the functional film is disposed on a front surface of the porous support and extends into the porous support.

18 Claims, 6 Drawing Sheets

FOREIGN PATENT DOCUMENTS

| | | |
|---|---|---|
| JP | 54-57475 A | 5/1979 |
| JP | 59-120211 A | 7/1984 |
| JP | 59-120211 A | 7/1984 |
| JP | 60-238103 A | 11/1985 |
| JP | 61-15705 A | 1/1986 |
| JP | 64-42444 A | 2/1989 |
| JP | 4-27422 A | 1/1992 |
| JP | 4-21526 B2 | 4/1992 |
| JP | 9-313905 A | 12/1997 |
| JP | 10-225626 * | 8/1998 |
| JP | 10-225626 A | 8/1998 |
| JP | 2001-157825 A | 6/2001 |

* cited by examiner

SEPARATION MEMBRANE

TECHNICAL FIELD

The present invention relates to a separation membrane including a porous support and a functional film for separation, the functional film being placed only on a face of the porous support. The separation membrane of the present invention is used for nano-filtration separation or reverse osmosis separation.

BACKGROUND ART

In usual, separation membranes used for nano-filtration separation or reverse osmosis separation are prepared by applying film-forming solutions onto porous supports.

Such separation membranes are categorized into two types: one including a porous support and a functional film placed only on a face of the porous support and the other including a porous support and functional films placed on both faces of the porous support. Both types of separation membranes have advantages and disadvantages. In general, the former has a disadvantage that the functional film is apt to be peeled off because the adhesion between the functional film and the porous support is weak, and the latter has a disadvantage that separation/removal performance is low when used in the form of an element or a module, because the thickness is large. In recent years, there has been a need for an increase in the membrane area of modules including such separation membranes. Since the membrane area per volume is increased in inverse proportion to the thickness of the separation membranes, the former type of separation membrane that can be reduced in thickness has become dominant.

In the separation membrane including the functional film placed only on a face of the porous support, the adhesion between the functional film and the porous support can be enhanced by allowing a film-forming solution to permeate the porous support sufficiently. However, when an excessive amount of the film-forming solution is allowed to permeate the porous support, the film-forming solution reaches a rear face of the porous support. The film-forming solution present on the rear face soils a film-forming apparatus and therefore causes the following problems: defects are formed in a subsequent separation membrane and/or a surface of an adjacent separation membrane is deteriorated when it is coiled.

Japanese Examined Patent Application Publication No. 4-21526 discloses a technique for solving the above problems, that is, a technique in which a film-forming solution is applied onto a porous support having a bilayer structure consisting of a rough front layer and a dense rear layer. In this technique, the adhesion between the functional film and the porous support is enhanced by allowing the solution to permeate the front layer sufficiently and the solution is prevented from reaching a rear surface of the porous support by the dense rear layer.

However, in the technique, the porous support has a large thickness; hence, a separation membrane having a small thickness.cannot be prepared, although such a separation membrane has been recently demanded.

DISCLOSURE of INVENTION

It is an object of the present invention to provide a separation membrane in which a film-forming solution can be prevented from reaching a rear surface of a porous support in a step of forming a film, the adhesion between a functional film for separation and the porous support is high, and the thickness is small.

In order to achieve the object, the separation membrane includes a functional film for separation and a porous support having a rough rear surface, and the functional film is disposed on a front surface of the porous support and extends into the porous support.

In the separation membrane, the rear surface of the porous support preferably has a large number of dents, and the functional film preferably extends to the dents of the rear surface of the porous support and is attached to the dents.

In the separation membrane, a region extending from the rear surface of the porous support to a depth equal to 50% of the total thickness preferably has an average density ranging from 5% to 90% of that of a region extending from the front surface of the porous support to a depth equal to 50% of the total thickness.

The present invention provides a separation membrane element including the separation membrane, a permeate carrier, a feed spacer, and a permeate core tube, the separation membrane being spiral-wound around the permeate core tube together with the permeate carrier and the feed spacer. Furthermore, the present invention provides a separation membrane module including the separation membrane element and a pressure vessel, the element being placed in the vessel.

BEST MODE FOR CARRYING OUT THE INVENTION

Figure 1:
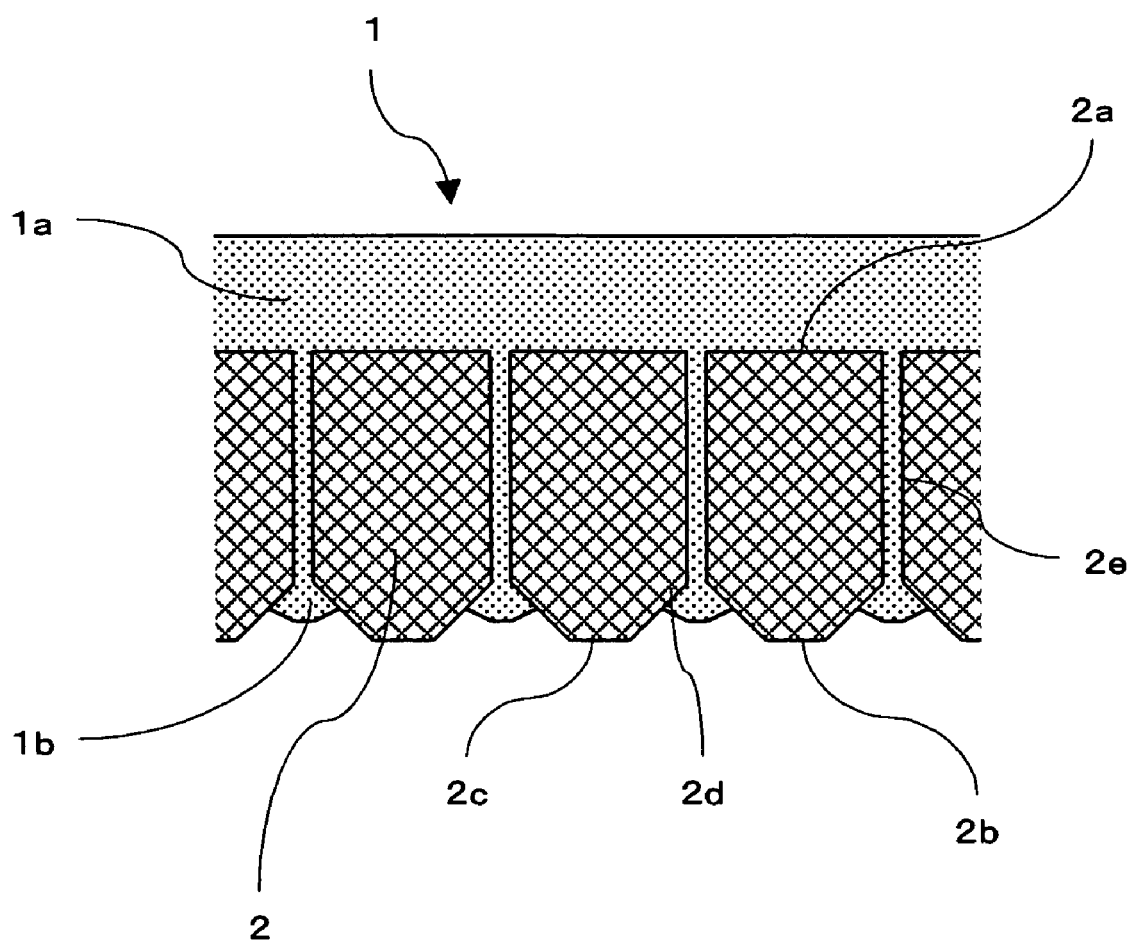
FIG. 1 is a sectional view showing a separation membrane according to an embodiment of the present invention.
Figure 2:
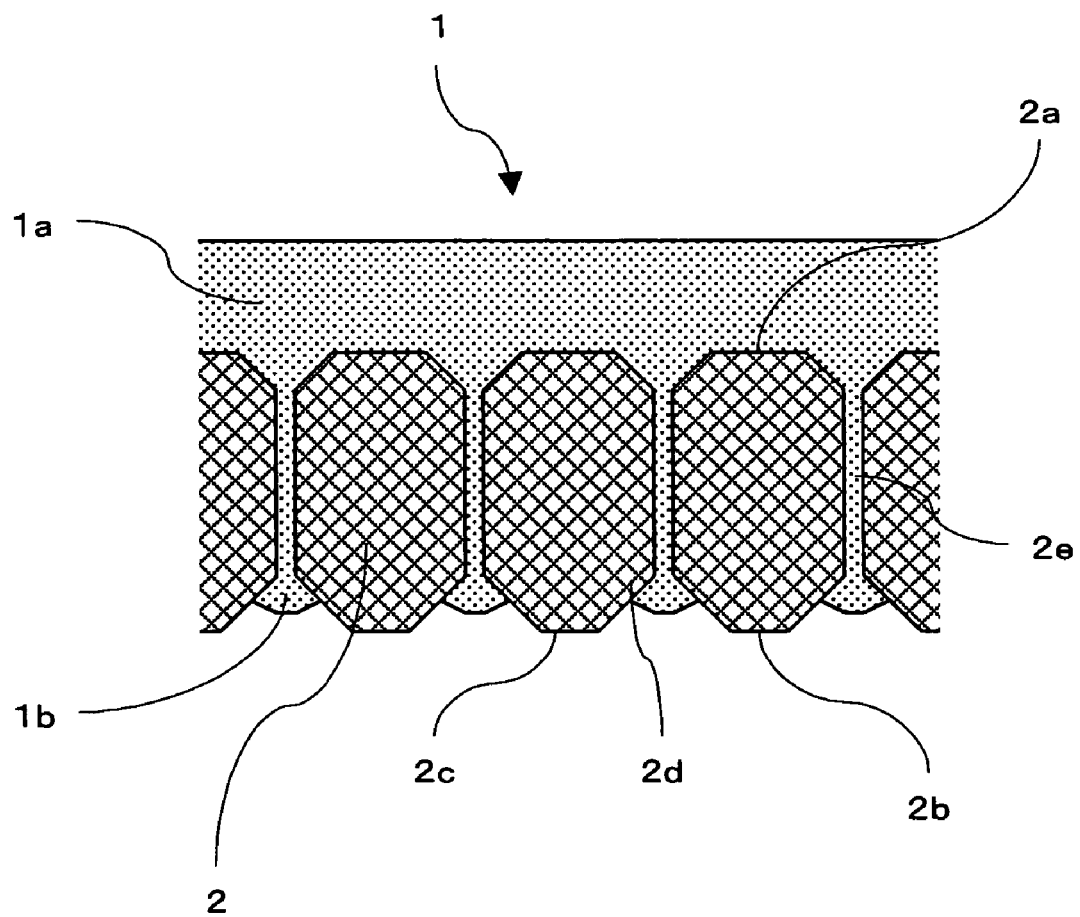
FIG. 2 is a sectional view showing a separation membrane according to another embodiment of the present invention.
Figure 3:
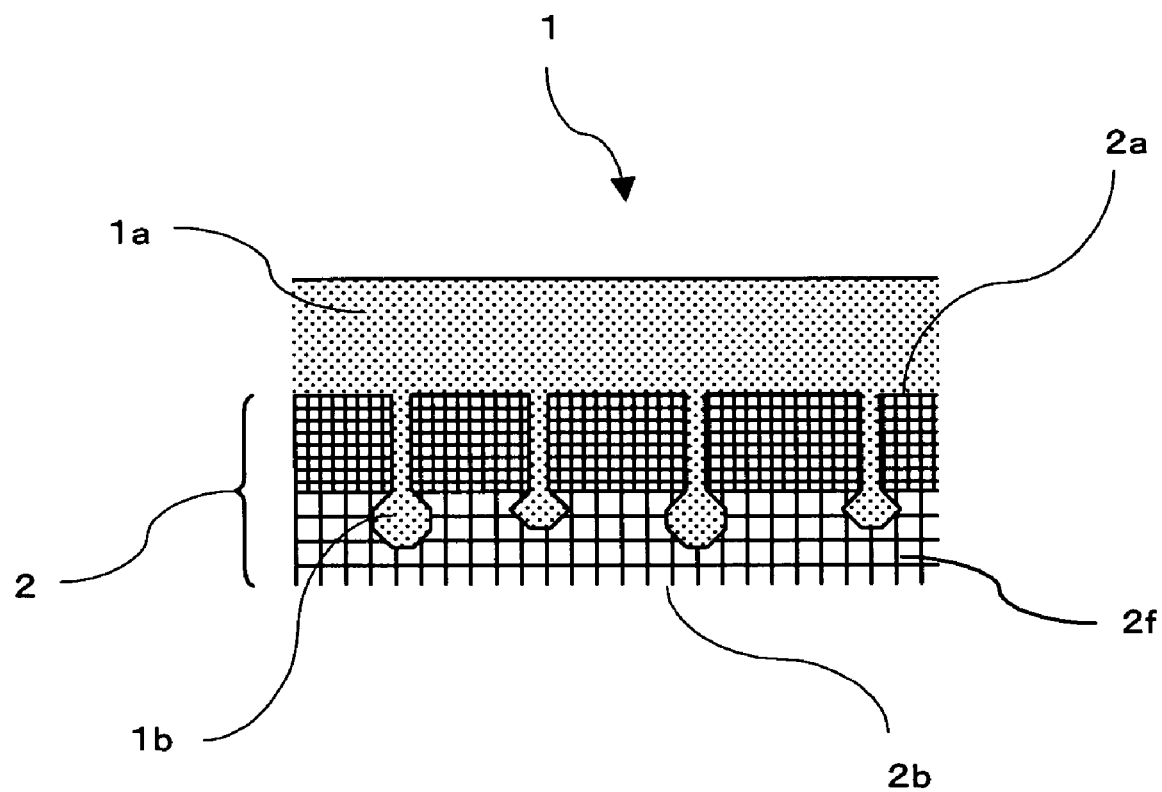
FIG. 3 is a sectional view showing a separation membrane according to another embodiment of the present invention.
Figure 4:
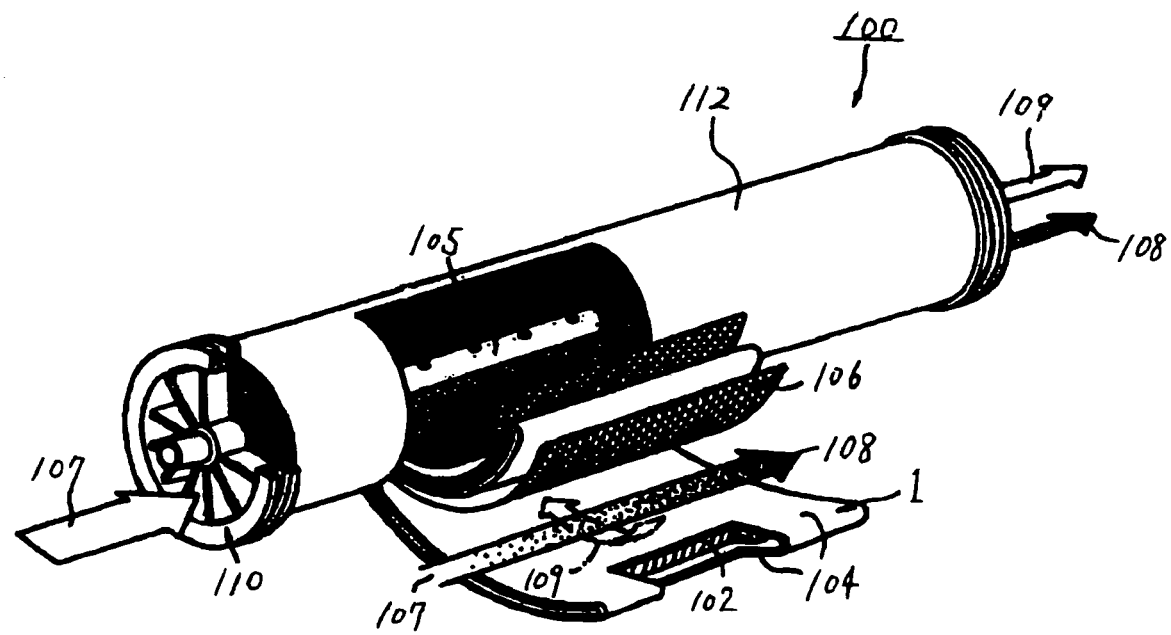
FIG. 4 is a partly exploded perspective view showing a separation membrane element including a separation membrane according to the present invention.
Figure 5:
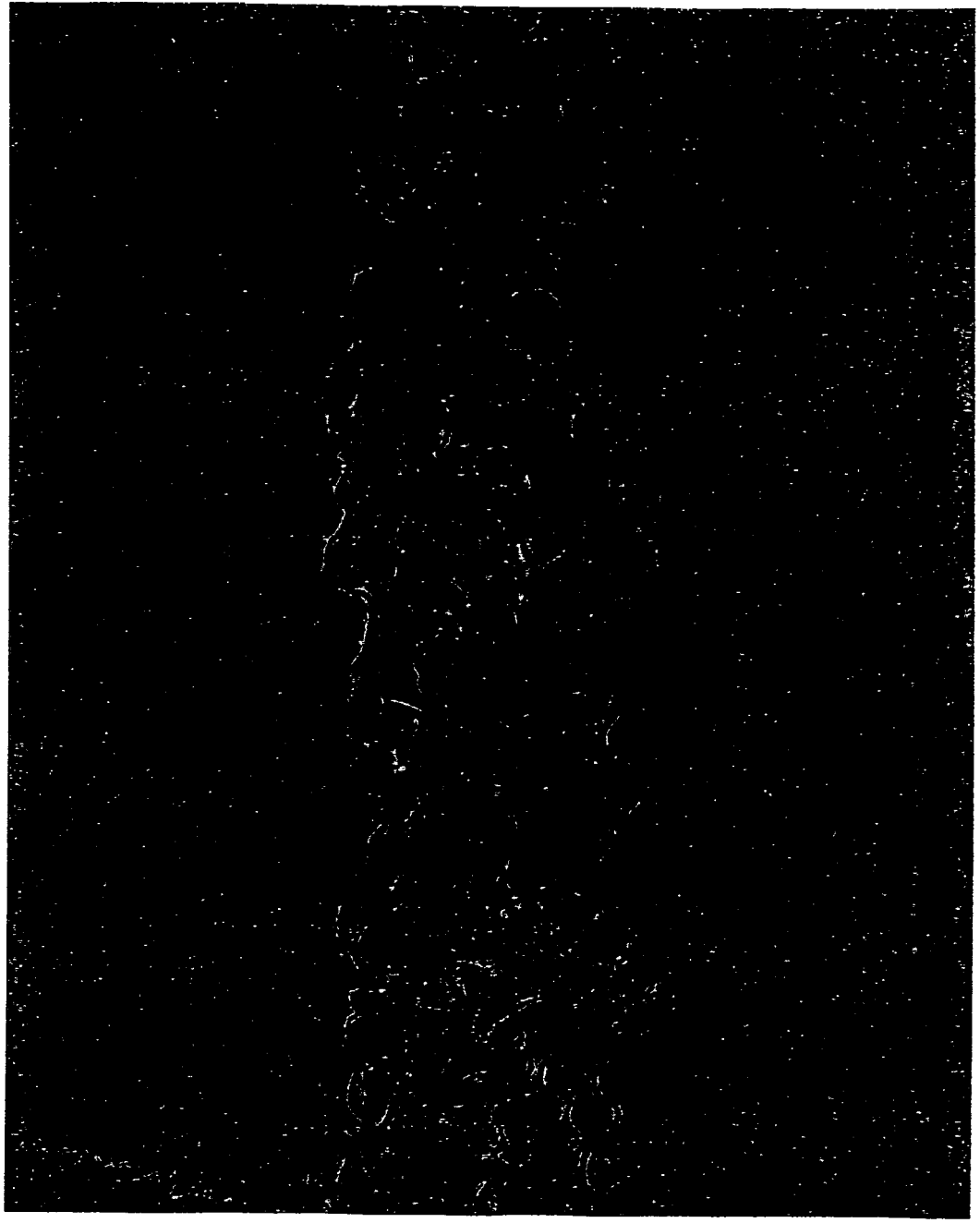
FIG. 5 is a photograph showing a cross section of an example of non-woven fabric for preparing a porous support of a separation membrane according to the present invention.
Figure 6:
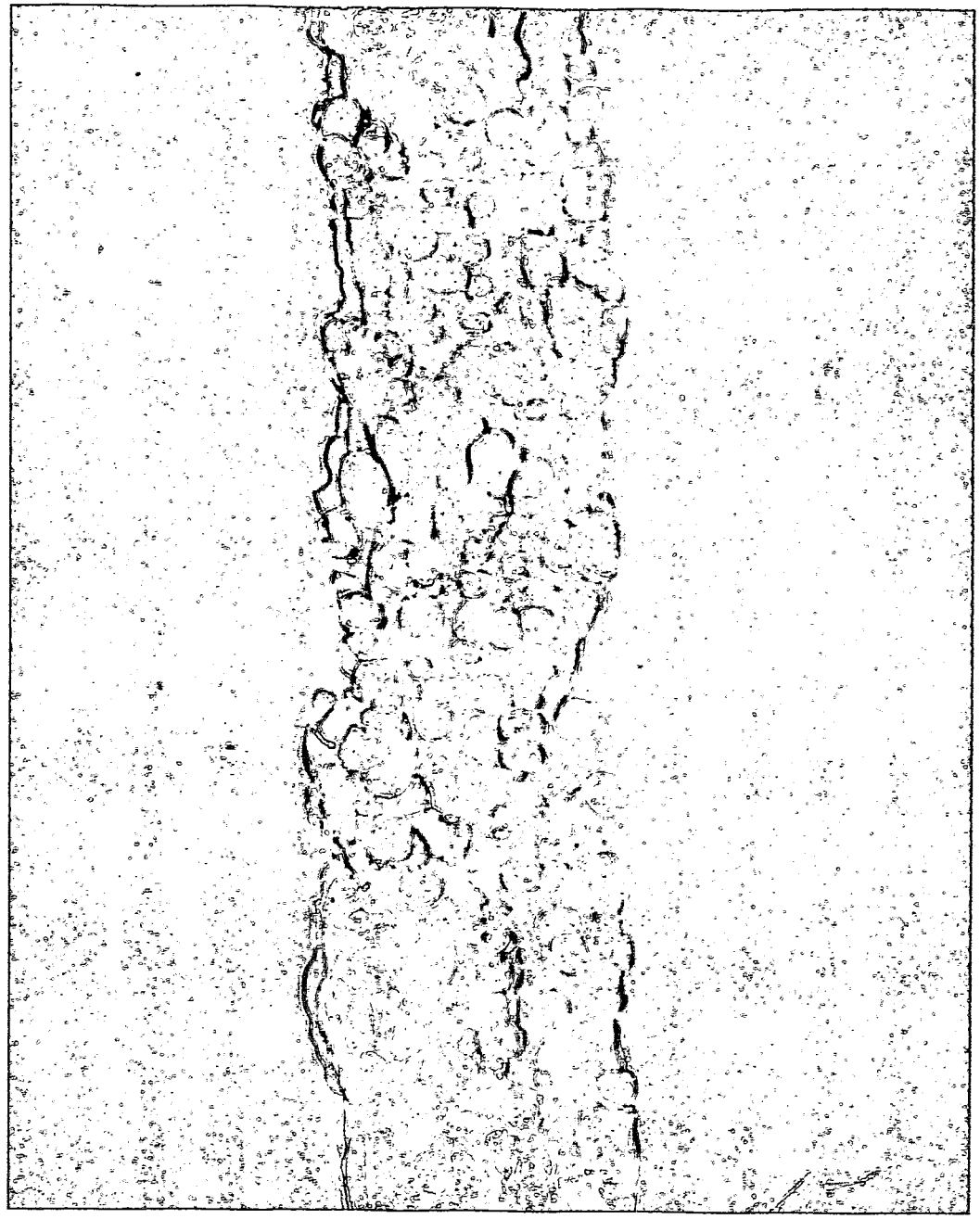
FIG. 6 is a photograph showing a cross section of an example of non-woven fabric for preparing a porous support of a known separation membrane.

Embodiments of the present invention will now be described with reference to the accompanying drawings. FIGS. 1, 2, and 3 are sectional views showing separation membrane according to the embodiments of the present invention. FIG. 5 is a photograph showing a cross section of an example of non-woven fabric for preparing a porous support of a separation membrane according to the present invention. FIG. 6 is a photograph showing a cross section of an example of non-woven fabric for preparing a porous support of a known separation membrane. FIG. 4 is a partly exploded perspective view showing a separation membrane element including a separation membrane of the present invention.

A separation membrane of the present invention includes a functional film for separation and a porous support, and the functional film is placed on the porous support and extends into the porous support. The separation membrane is preferably used for reverse osmosis separation, nano-filtration separation, and the like.

The porous support is made of a porous material having no separation function and has a function of enhancing the strength of the separation membrane. The functional film has a separation function, and examples thereof include an asymmetric film and a composite film.

Examples of the porous support include woven fabric, non-woven fabric, and net made of polyester, polypropylene, polyethylene, or polyamide, and the non-woven fabric is preferable due to film-forming properties and manufacturing cost. The non-woven fabric can be manufactured by, for example, the following procedure: main fibers and binder fibers dispersed in water are filtered out using a cylinder paper machine, a fourdrinier paper machine, or the like, and the obtained fibers are then dried with a dryer. In order to remove fluff or in order to enhance mechanical properties, the non-woven fabric is preferably processed by high-pressure thermal treatment in such a manner that the non-woven fabric is placed between two rolls.

The asymmetric film is a kind of functional film, made of a single material, for separation. The asymmetric film is prepared by allowing a solution for forming the functional film to be spread over the porous support to form a layer. Examples of a material for forming the functional film include polyacrylonitrile, polysulfone, polyethersulfone, polyphenylenesulfone, polyphenylene sulfide sulfone, polyvinylidene fluoride, cellulose acetate, polyethylene, and polypropylene.

The composite film is a kind of functional film including a microporous support sheet and a layer that is substantially responsible for performing membrane separation. The composite film is prepared by the following procedure: the microporous support sheet is provided on a porous support and the layer substantially responsible for performing membrane separation is then formed on the microporous support sheet. Examples of a material for forming the microporous support sheet include, for example, polysulfone, polyethersulfone, polyphenylene sulfide sulfone, polyphenylenesulfone, polyphenylene oxide, polyphenylene sulfide, polyacrylonitrile, polyamide, polyester, and polyimide. Examples of the layer substantially responsible for performing membrane separation include a semipermeable membrane containing polyamide, polyimide, or cellulose acetate. Various materials can be used for forming the microporous support sheet or the layer substantially responsible for performing membrane separation, and various methods may be used for forming the microporous support sheet or the layer substantially responsible for performing membrane separation.

FIG. 1 shows an example of a separation membrane of the present invention. The separation membrane 1 includes a functional film 1a for separation and a porous support 2, and the functional film 1a is placed on a front surface 2a of the porous support 2 and extends into the porous support 2. The separation membrane 1 is prepared by the following procedure: a solution for forming the functional film is applied onto the front surface 2a of a porous support 2 and the applied solution is then solidified.

In the above procedure, the solution is allowed to flow through holes 2e of the porous support 2 to diffuse in the porous support 2 and is then solidified. Therefore, the functional film 1a extends in the porous support 2; hence, the adhesion between the functional film 1a and the porous support 2 is high. When the amount of the solution permeating the porous support 2 is small, the adhesion between the functional film 1a and the porous support 2 is low; hence, the functional film 1a is therefore apt to be peeled off. In contrast, when the amount of the solution permeating the porous support 2 is large, the adhesion therebetween is high. However, when the amount of the solution permeating the porous support 2 is excessively large, the solution reaches a rear surface 2b. Therefore, the solution soils a film-forming apparatus to cause defects in a separation membrane prepared subsequently. Furthermore, the solution that has reached the rear surface and has been then solidified causes damage to a surface of an adjacent separation membrane and/or causes defects therein when the separation membrane is coiled or spiral-wound. In particular, when the thickness of the porous support is reduced to prepare a thin separation membrane, those problems are apt to occur.

In the present invention, the porous support 2 is one having a rough rear surface. Examples of such a porous support having a rough rear surface include the rear surface 2b having a large number of dents 2d as shown in FIG. 1.

In an example shown in FIG. 1, the rear surface 2b of the porous support 2 has a large number of the dents 2d arranged in a distributed manner, and the functional film 1a extends to the dents 2d of the rear surface 2b of the porous support 2 and is attached to the dents 2d. The sentence "the functional film extends to the dents of the rear surface and is attached to the dents" means a situation that the solution that has reached the dents 2d but has not reached lumps 2c and has been then solidified, the lumps 2c being outermost portions of the rear surface.

The solution applied onto the front surface is allowed to flow through the holes 2e of the porous support 2 to reach the dents 2d of the rear surface 2b and is then solidified. Since the solution that has reached the dents 2d is spread in the horizontal direction as shown in FIG. 1, the solution can hardly reach the lumps 2c.

Portions of the solution solidified in the dents 2d are recessed from the lumps 2c of the porous support 2. Thus, the solution solidified at the rear surface can be prevented from causing defects in the separation membrane. The solution solidified in the dents 2d forms anchors 1b, which are attached to the dents 2d. Thus, the adhesion between the porous support 2 and the functional film 1a is high.

FIG. 2 shows another embodiment of the present invention. A porous support, used in the present invention, having a rough rear surface may have a front surface with dents as shown in FIG. 2. When the front and rear surfaces both have the dents, the porous support has low strength, which causes a decrease in the strength of a separation membrane. Thus, the front surface of the porous support is preferably smooth.

FIG. 3 shows another example of a porous support having a rough rear surface, which has no recognizable dents. A region of the rear surface has a density less than that of a region of the front surface. In such an example, the same advantage as that of the porous support having the dents can be obtained.

The solution applied onto the front surface of the porous support 2 is allowed to flow through the holes 2e to reach a layer 2f (hereinafter referred to as a coarse layer), located on the rear side, having low density and is then solidified. Since the solution that has reached the coarse layer 2f is spread in the horizontal direction as shown in FIG. 3, the solution can hardly reach the rear surface 2b. Thus, the solution that has reached the rear surface and has then been solidified can be prevented from causing defects in the separation membrane.

The solution solidified in the coarse layer 2f forms anchors 1b, which are attached to the coarse layer 2f. Thus, the adhesion between the porous support 2 and the functional film 1a is high.

In the present invention, it is critical that a region (hereinafter referred to as a rear region) extending from the rear surface of the porous support to a depth equal to 50% of the total thickness have an average density ranging from 5% to 90% of that of a region (hereinafter referred to as a front region) extending from the front surface of the porous support to a depth equal to 50% of the total thickness. Since the rear region has an average density less than or equal to 90% of that of the front region, the solution that has reached the rear surface and has then been solidified can be prevented from causing defects in the separation membrane. The rear region preferably has an average density less than or equal to 80% of that of the front region and more preferably 70% or less. Since the rear region has an average density greater than or equal to 5% of that of the front region, the separation membrane has high strength. The rear region preferably has an average density greater than or equal to 15% of that of the front region and more preferably 30% or more.

The average density is herein defined as the percentage of the cross-sectional area of the porous support in the area of a measurement section when the porous support is cut perpendicular to a surface, the cross-sectional area being determined using an enlarged photograph of a cross section taken using an optical microscope. That is, the average density is defined as a value obtained by dividing the cross-sectional area of the porous support by the area of the measurement section. Details of a method for determining the average density will be described below.

The functional film preferably extends to the region extending from the rear surface of the porous support to a depth equal to 50% of the total thickness, that is, the rear region. The sentence "the functional film extends to the rear region" means a situation that the solution has reached the rear region but has not reached the rear surface $2b$ and has been solidified. Since the functional film extends to the rear region, the adhesion between the porous support 2 and the functional film $1a$ is high.

In the present invention, the porous support having the rough rear surface is used. A method for preparing the porous support is not particularly limited and the porous support is preferably processed by high-pressure thermal treatment. When the non-woven fabric is used, the rear surface of a sheet of the non-woven fabric is preferably rendered rough by the high-pressure thermal treatment during the production of the non-woven fabric in view of productivity and manufacturing cost.

Examples of the high-pressure thermal treatment include embossing and calendering. When calendering is used, the smoothness of the porous support controlled by adjusting the surface temperature of two rolls between which the porous support is placed, the clamping force of the rolls, and the transfer speed of the porous support, that is, the pressing time. Surfaces of the porous support are smooth when the surface temperature of the rolls is high and the contact time between the porous support and the rolls is long. Surfaces of the porous support are rough when the surface temperature is low and the contact time is short. That is, the porous support having preferable properties can be obtained in such a manner that the temperature of one of the rolls in contact with the rear surface of the porous support is less than that of the other in contact with the front surface of the porous support or the contact time between the rear surface of the porous support and one of the rolls is less than the contact time between the front surface of the porous support and the other. When embossing is used, the porous support having preferable properties can be obtained by pressing a roll having irregularities against the rear surface of the porous support.

The porous support preferably has a thickness of 40 µm to 150 µm. When the thickness is less than 40 µm, the separation membrane has low strength. In contrast, when the thickness is more than 150 µm, the separation membrane cannot be reduced in thickness. The porous support more preferably has a thickness of 40 µm to 80 µm.

The rear surface of the porous support preferably has a smoothness of 1 to 20 s, the smoothness being determined according to JIS P8119. In order to increase the depth of the dents of the rear surface of the porous support and in order that the solution does not reach the lumps $2c$ and is securely solidified in the dents $2d$, the smoothness is preferably 20 s or less, more preferably 15 s or less, and most preferably 10 s or less. In contrast, when the porous support has an extremely small smoothness, the thickness must be large and irregularities of the rear surface of the porous support can cause damage to a surface of an adjacent separation membrane in some cases when the separation membrane is coiled or spiral-wound. Therefore, the smoothness is preferably 1 s or more, more preferably 3 s or more, and most preferably 5 s or more.

The separation membrane described above is folded into two parts and a permeate carrier 102 is place between the parts thereof, whereby an envelope membrane 104 is prepared as shown in FIG. 4. The resulting envelope membrane 104 is spiral-wound around a permeate core tube 105 together with a feed spacer 106. The resulting-envelope membrane 104 is used as a component of a separation membrane element 100. In order to enhance the shape stability during the use thereof, end plates 110 are each placed at corresponding ends of the insulating substrate 100 when viewed in the axis direction and a filament-winding layer 112 is placed on an outer section thereof.

In the separation membrane element, a feed liquid 107 is allowed to flow into one of the ends arranged in the axis direction and then permeates through the separation membrane 1 while it is allowed to flow through channels extending in the feed spacer. The liquid permeating therethrough is allowed to flow through channels extending in the permeate carrier 102, collected in the permeate core tube, and then withdrawn from the other end. The resulting liquid is referred to as a permeating liquid 109. The rest of the feed liquid 107 that does not permeate through the separation membrane 1 is withdrawn, and the resulting liquid is referred to as a concentrated liquid 108. The separation membrane element is placed in a pressure vessel, and they form a separation membrane module for fluid.

Characteristics specified herein were determined according to the procedures described below.

[Method for Determining Thickness]

Measurement was performed according to JIS P8118 as described below. A micrometer including two parallel, circular pressure faces was used: one is a fixed pressure face. with a diameter of 16.0 mm or more and the other is a movable pressure face that moves vertically and has a diameter of 16.0 mm. The micrometer was placed on an anti-vibration table having a horizontal face, and each test sample was placed between the pressure faces. The movable pressure face was moved at a rate of 3 mm/s or less and a pressure of 100 kPa was applied between the pressure faces. It was confirmed that the test sample was retained between the pressure faces, and a value was recorded just after the stabilization. For each test sample, 20 places were measured and the average of obtained values was used as the thickness.

[Method for Determining Average Density]

A porous support was cut perpendicularly to a surface, and a photograph of a cross section was taken using an optical microscope with a magnification of 700×. An image of the porous support was transferred from the photograph to a sheet of plain paper by tracing. In the image, two parallel straight lines are each provided on a front surface and rear surface of the porous support. The two parallel lines, which each indicate the front surface or the rear surface, were each in contact with highest protrusions of the front surface or the rear surface. Additional two parallel lines were provided in such a manner that they extend perpendicularly to the two parallel lines each indicating the front surface or the rear surface and the distance therebetween is three times greater than that between the two parallel lines each indicating the front surface or the rear surface. A region surrounded by the four straight lines was defined as a measurement section. The distance between the parallel lines each indicating the front surface or the rear surface was defined as the thickness of the porous support.

Subsequently, a straight line parallel to the surfaces was provided at the center between the two parallel lines each indicating the front surface or the rear surface, that is, a center line was provided. In the measurement section, a region extending from the front surface to the center line was defined as "a region extending from the front surface to a depth equal to 50% of the total thickness", that is, "a front region". Furthermore, a region extending from the rear surface to the center line was defined as "a region extending from the rear surface to a depth equal to 50% of the total thickness", that is, "a rear region".

In the rear region, the average density thereof was defined as a value obtained by dividing the percentage of the cross-sectional area of the porous support in the area of the section by the area of the entire section.

In the rear region as well as the above, the average density thereof was defined as a value obtained by dividing the percentage of the cross-sectional area of the porous support in the area of the section by the area of the entire section.

[Method for Determining Smoothness]

Measurement was performed according to JIS P8119 as described below. A test piece of the porous support was placed on a flat-finished, ring-shaped glass plate having an outer diameter of 37.4±0.05 mm and an effective flat area 10±0.05 cm$^2$. The glass plate had a circular hole that is located at the center thereof and connected to a vacuum vessel. A circular rubber holder and a metal pressure plate connected to a pressure device were placed on the test piece, and a pressure of 100 kPa was applied to the pressure plate using the pressure device, whereby the test piece was pressed against the glass plate. The rubber holder had a diameter of 45 mm or more, a thickness of 4±0.2 mm, a maximum thickness change of ±0.05 mm, a hardness of 40±5 IRHD, and a rebound resilience of 62% or more, the hardness being determined according to ISO 48, the rebound resilience being determined according to ISO 4662. The pressure plate had a circular, flat face with a diameter of 45 mm or more. The pressure in the vacuum vessel was reduced to 50.7 kPa or less and the vacuum vessel was then left stationary, whereby the pressure in the vacuum vessel was gradually increased because air passes between the glass plate and the test piece. A measurement was made to determine the time elapsed until the pressure in the vacuum vessel was varied from 50.7 kPa to 48.0 kPa. The elapsed time was defined as the smoothness.

[Method for Determining Adhesion Between Functional Film for Separation and-Porous Support]

Samples having a width of 15 mm were prepared. Bonded faces of each sample were partly peeled off from each other, and the resulting sample was set in a tensile testing machine in such a manner that the sample forms a T-shape, the measurement length being 150 mm. The tensile test was performed under the following conditions: a temperature of 25° C., a relative humidity of 65%, and a rate of 50 mm/min. The average of tensile forces applied to the sample having the measurement length was defined as the peel strength.

EXAMPLE 1

A porous support was prepared by the following procedure: a sheet of polyester non-woven fabric (a basis weight of 60 g/m$^2$, a thickness of 80 μm, and a width of 250 mm) was calendered in such a manner that the temperature of a rear roll was less than that of a front roll, whereby the smoothness of a front surface of the sheet was adjusted to 21 s and the smoothness of a rear surface of the sheet was adjusted to 7 s. Polysulfone (Udel (registered trade mark) P-3500 manufactured by Solvay Advanced Polymers KK) was used for forming a functional film for separation. The polysulfone was dissolved in dimethylformamide, whereby a polysulfone solution (a concentration of 16 percent by weight and a temperature of 20° C.) was prepared and used for forming the film. The solution was applied onto the front surface of the non-woven fabric sheet, whereby a coating having a width of 200 mm and a thickness of 200 μm was formed. In the above operation, drums were arranged under the rear surface of the non-woven fabric sheet onto which the polysulfone solution is not applied, whereby the non-woven fabric sheet was transferred.

After 0.5 seconds had elapsed since the polysulfone solution was applied onto the non-woven fabric sheet, the resulting non-woven fabric sheet was immersed in pure water maintained at 20° C., whereby the polysulfone solution was solidified and a composite film including a microporous polysulfone layer and the non-woven fabric sheet was prepared. The composite film was water-washed in a washing drum, whereby the solvent remaining in the film was removed. The resulting composite film was coiled with a coiling machine. The resulting composite film was immersed in an aqueous solution containing 2 percent by weight of m-phenylene diamine for one minute. After an excess of the solution was removed from surfaces of the polysulfone layer, the solution was concentrated at 80° C. for one minute using a hot air dryer. Subsequently, the polysulfone layer was coated with a n-decane solution containing 0.1 percent by weight of trimesic chloride in such a manner that surfaces of the polysulfone layer are entirely wet, and the resulting polysulfone layer was left stationary for one minute, whereby a polyamide layer that is. substantially responsible for performing membrane separation was formed on the polysulfone layer, thereby preparing a separation membrane (a thickness of 170 μm).

After the polysulfone layer was formed, it was observed that the drums are not soiled with the solution at all. There were no visible defects on the front surface of the coiled separation membrane, that is, the membrane surface was in a good state. A cross section of the separation membrane was observed with an optical microscope, and the observation showed that the rear surface of the non-woven fabric sheet has dents. Furthermore, it was observed the polysulfone layer extends to a region close to the rear surface of the non-woven fabric sheet and is attached to the dents. The adhesion between the functional film and porous support of the separation membrane was measured, and the measurement showed that the adhesion was 19.6 N/m, which is a sufficient value for the separation membrane.

EXAMPLE 2

A separation membrane (a thickness of 175 μm) was prepared in the same manner as that described in Example 1 except that a porous support was prepared by the following procedure: a sheet of polyester non-woven fabric (a basis weight of 84 g/m$^2$, a thickness of 95 μm, and a width of 250 mm) was calendered in such a manner that the temperature of a rear roll is less than that of a front roll, whereby the smoothness of a front surface of the sheet was adjusted to 20 s and the smoothness of a rear surface of the sheet was adjusted to 16 s.

After the polysulfone layer was formed, it was observed that the drums are not soiled with the solution at all. There were a slight number of visible defects on the front surface of the coiled separation membrane; however, such defects seemed unlikely to cause problems in practical use. A cross section of the separation membrane was observed with an optical microscope, and the observation showed that the rear surface of the non-woven fabric sheet has dents. Furthermore, it was observed the polysulfone layer extends to a region close to the rear surface of the non-woven fabric sheet and is attached to the dents. The adhesion between the functional film and porous support of the separation membrane was measured, and the measurement showed that the adhesion was 22.9 N/m, which is a sufficient value for the separation membrane.

EXAMPLE 3

A separation membrane (a thickness of 130 μn) was prepared in the same manner as that described in Example 1 except that a porous support was prepared by the following procedure: a sheet of polyester non-woven fabric (a basis weight of 65 g/m$^2$, a thickness of 72 μm, and a width of 250 mm as shown in FIG. 5) was calendered in such a manner that the temperature of a rear roll is less than that of a front roll, whereby the average density of a front region of the sheet was adjusted to 69% and that of a rear region of the sheet was adjusted to 45%, that is, the average density of the rear region was adjusted to 66% of that of the front region. The front surface of the polyester non-woven fabric sheet had a smoothness of 10 s and the rear surface had a smoothness of 5 s.

After the polysulfone layer was formed, it was observed that the drums are not soiled with the solution at all. There were no visible defects on the front surface of the coiled separation membrane, that is, the membrane surface was in a good state. A cross section of the separation membrane was observed with an optical microscope, and the observation showed that the rear surface of the non-woven fabric sheet has dents. It was observed the polysulfone layer extends to a region close to the rear surface of the non-woven fabric sheet and is attached to the dents. The adhesion between the functional film and porous support of the separation membrane was measured, and the measurement showed that the adhesion was 19.6 N/m, which is a sufficient value for the separation membrane.

COMPARATIVE EXAMPLE 1

A separation membrane (a thickness of 170 μm) was prepared in the same manner as that described in Example 1 except that a porous support was prepared by the following procedure: a sheet of polyester non-woven fabric (a basis weight of 60 g/m$^2$, a thickness of 80 μm, and a width of 250 mm) having a smooth rear surface was calendered in such a manner that the temperature of a rear roll is greater than that of a front roll, whereby the smoothness of a front surface of the sheet was adjusted to 7 s and the smoothness of the rear surface was adjusted to 21 s.

After the polysulfone layer was formed, it was observed that the drums are soiled with the solution. That is, it was observed that the solution reaches the rear surface of the non-woven fabric sheet. There were visible defects on the front surface of the coiled separation membrane, and the defects seemed to be formed by the contact of the front surface with the separation membrane that reached the rear surface of an adjacent porous support. The adhesion between the functional film and porous support of the separation membrane was measured, and the measurement showed that the adhesion was 22.9 N/m.

COMPARATIVE EXAMPLE 2

A separation membrane (a thickness of 130 μm) was prepared in the same manner as that described in Example 1 except that a porous support was prepared by the following procedure: a sheet of polyester non-woven fabric (a basis weight of 65 g/m$^2$, a thickness of 72 μm, and a width of 250 mm) having a smooth rear surface was calendered in such a manner that the temperature of a rear roll is greater than that of a front roll, whereby the average density of a front region of the sheet was adjusted to 45% and that of the rear region was adjusted to 69%, that is, the average density of the rear region was adjusted to 152% of that of the front region.

After the polysulfone layer was formed, it was observed that the drums are soiled with the solution. That is, it was observed that the solution reaches the rear surface of the non-woven fabric sheet. There were visible defects on the front surface of the coiled separation membrane, and the defects seemed to be formed by the contact of the front surface with the separation membrane that reached the rear surface of an adjacent porous support. The adhesion between the functional film and porous support of the separation membrane was measured, and the measurement showed that the adhesion was 22.9 N/m.

INDUSTRIAL APPLICABILITY

In a separation membrane according to the present invention, a film-forming solution can be prevented from reaching a rear surface of a porous support in a step of forming a film and the adhesion between a functional film for separation and the porous support can be enhanced. Therefore, an apparatus for manufacturing the membrane can be maintained clean; hence, the maintenance of such an apparatus is easy. Furthermore, in a step of coiling the separation membrane, surfaces of an adjacent separation membrane can be prevented from being damaged; hence, defects can be prevented from being formed in the separation membrane. Thus, the separation membrane with high performance can be provided at low cost. Since the separation membrane of the present invention can be reduced in thickness, separation-membrane elements and modules including the separation membrane can be increased in the area of the packed membrane. The separation membrane of the present invention is preferably used for nano-filtration separation and reverse osmosis separation.

The invention claimed is:

1. A separation membrane comprising a functional film for separation and a woven or non-woven fabric porous support having a rough rear surface and having no substantial separation function, wherein the rear region of the porous support has an average density less than that of a region of the front surface, the functional film comprises a microporous support sheet and a layer that is substantially responsible for performing membrane separation, the functional film is disposed on a front surface of the porous support, and the functional film extends into the porous support but not to the outermost portions of the rear surface.

2. The separation membrane according to claim 1, wherein the rear surface of the porous support has a large number of dents and the functional film extends to the dents of the rear surface of the porous support and is attached to the dents.

3. The separation membrane according to claim 1, wherein a region extending from the rear surface of the porous support to a depth equal to 50% of the total thickness has an average density ranging from 5% to 90% of that of a region extending from the front surface of the porous support to a depth equal to 50% of the total thickness, wherein the average density represents the percentage of the cross-sectional area of the porous support in the area of a measurement section when the porous support is cut perpendicular to a surface.

4. The separation membrane according to claim 1, wherein the functional film extends to the region extending from the rear surface of the porous support to a depth equal to 50% of the total thickness.

5. The separation membrane according to claim 1, wherein the porous support is processed by high-pressure thermal treatment.

6. The separation membrane according to claim 1, wherein the rear surface of the porous support has a smoothness ranging from 1 to 20 s, the smoothness being determined according to JIS P8119.

7. The separation membrane according to claim 6, wherein the rear surface of the porous support has a smoothness ranging from 5 to 20 s, the smoothness being determined according to JIS P8119.

8. The separation membrane according to claim 1, wherein the porous support has a thickness ranging from 40 to 150 μm.

9. The separation membrane according to claim 8, wherein the porous support has a thickness ranging from 40 to 80 μm.

10. A separation membrane element comprising the separation membrane according to claim 1, a permeate carrier, a feed spacer, and a permeate core tube, wherein the separation membrane is spiral-wound around the permeate core tube together with the permeate carrier and the feed spacer.

11. A separation membrane module comprising the separation membrane element according to claim 10 and a pressure vessel, wherein the element is placed in the vessel.

12. The separation membrane according to claim 1, wherein the layer that is substantially responsible for performing membrane separation is a semipermeable membrane comprising polyamide, polyimide or cellulose acetate.

13. The separation membrane according to claim 5, wherein the high-pressure thermal treatment comprises one of embossing and calendering.

14. A separation membrane comprising a functional film for separation and a woven or non-woven fabric porous support having a rough rear surface and having no substantial separation function, wherein the porous support has a region of the rear surface whose density is less than that of a region of the front surface, the functional film comprises a microporous support sheet and a layer that is substantially responsible for performing membrane separation, the functional film is disposed on a front surface of the porous support and extends into the porous support, wherein the rear surface of the porous support has a large number of dents, and wherein the functional film extends to the dents of the rear surface of the porous support and is attached to the dents.

15. The separation membrane according to claim 14, wherein the rear surface of the porous support is rendered rough by high-pressure thermal treatment.

16. The separation membrane according to claim 15, wherein the high-pressure thermal treatment comprises calendering, and wherein the smoothness of the porous support is controlled by adjusting the surface temperature of two rolls between which the porous support is placed and by adjusting the contact time between the porous support and the two rolls.

17. The separation membrane according to claim 14, wherein the rear surface of the porous support has a smoothness of 1 to 20 s, according to JIS P8119.

18. A separation membrane comprising a functional film for separation and a woven or non-woven fabric porous support having a rough rear surface and having no substantial separation function, wherein the porous support has a region of the rear surface whose density is less than that of a region of the front surfaces, the functional film comprises a microporous support sheet and a layer that is substantially responsible for performing membrane separation, the functional film is disposed on a front surface of the porous support and extends into the porous support, wherein the rear surface of the porous support has a large number of dents, and wherein the functional film extends to the dents of the rear surface of the porous support and is attached to the dents but does not extend to the outermost portions of the rear surface, thus preventing defects in the separation membrane.

* * * * *